United States Patent
Kim et al.

(10) Patent No.: US 11,802,944 B2
(45) Date of Patent: Oct. 31, 2023

(54) LIDAR DEVICE FOR VEHICLE AND OPERATING METHOD THEREOF

(71) Applicant: HYUNDAI MOBIS Co., Ltd., Seoul (KR)

(72) Inventors: Won Gyum Kim, Yongin-si (KR); Sung Eun Jo, Yongin-si (KR); Young Shin Kim, Yongin-si (KR); Kyung Rin Kim, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 568 days.

(21) Appl. No.: 16/938,189

(22) Filed: Jul. 24, 2020

(65) Prior Publication Data

US 2021/0025996 A1    Jan. 28, 2021

(30) Foreign Application Priority Data

Jul. 26, 2019 (KR) .................. 10-2019-0090783
Aug. 13, 2019 (KR) .................. 10-2019-0098558

(51) Int. Cl.
*G01S 7/497* (2006.01)
*G01S 17/931* (2020.01)
(Continued)

(52) U.S. Cl.
CPC .............. *G01S 7/497* (2013.01); *G01K 13/00* (2013.01); *G01S 7/4816* (2013.01); *G01S 17/08* (2013.01);
(Continued)

(58) Field of Classification Search
CPC .................................................. G01S 7/52006
See application file for complete search history.

(56) References Cited

U.S. PATENT DOCUMENTS

2018/0143308 A1* 5/2018 Vlaiko ................. G01S 7/4816
2019/0018416 A1* 1/2019 Gassend .............. G01S 17/931
(Continued)

FOREIGN PATENT DOCUMENTS

KR    10-2019-0030027       3/2019

OTHER PUBLICATIONS

Aalizadeh, M., Serebryannikov, A.E., Khavasi, A. et al. Toward Electrically Tunable, Lithography-Free, Ultra-Thin Color Filters Covering the Whole Visible Spectrum. Sci Rep 8, 11316 (2018). (Year: 2018).*

*Primary Examiner* — Yuqing Xiao
*Assistant Examiner* — Zhengqing Qi
(74) *Attorney, Agent, or Firm* — H.C. Park & Associates, PLC

(57) ABSTRACT

Provided is a lidar device for a vehicle including an optical transmitter configured to transmit an outgoing optical signal, an optical receiver configured to receive a plurality of return optical signals incident in different directions, at least one temperature sensor configured to identify a temperature of the lidar device, and a processor operatively coupled with the optical transmitter, the optical receiver, and the at least one temperature sensor. The processor is configured to control the optical transmitter to transmit the outgoing optical signal configured to detect an object, receive an object optical signal, reflected by the object, through the optical receiver, identify a temperature of the lidar device through the temperature sensor in response to the identifying of intensity of the object optical signal being less than reference intensity, and adjust a bandpass of an optical filter of the optical receiver based on the temperature of the lidar device.

16 Claims, 8 Drawing Sheets

(51) Int. Cl.
*G01K 13/00* (2021.01)
*G01S 17/08* (2006.01)
*G01S 7/481* (2006.01)
*B60R 11/00* (2006.01)

(52) U.S. Cl.
CPC ............. *G01S 17/931* (2020.01); *B60R 11/00* (2013.01); *B60R 2011/004* (2013.01)

(56) References Cited

U.S. PATENT DOCUMENTS

2019/0078934 A1* 3/2019 Weber ................... G01J 1/0414
2019/0079166 A1 3/2019 Kim et al.
2019/0235084 A1* 8/2019 Heussner ................ G01S 7/481

* cited by examiner

LIDAR DEVICE FOR VEHICLE AND OPERATING METHOD THEREOF

CROSS-REFERENCE TO RELATED APPLICATION

This application claims priority from and the benefit of Korean Patent Application No. 10-2019-0090783, filed on Jul. 26, 2019 and 10-2019-0098558, filed Aug. 13, 2019, which are hereby incorporated by reference for all purposes as if set forth herein.

BACKGROUND

Field

Exemplary embodiments relate to a lidar device for a vehicle and an operating method thereof.

Discussion of the Background

A lidar device for a vehicle is mounted on a bumper for a vehicle, and may be used to detect an object (e.g., a person, a vehicle or a structure) positioned in front of or behind the vehicle. For example, the lidar device for a vehicle may transmit an optical signal through an optical transmitter, may filter the remaining signals, except an optical signal reflected by the object, among a plurality of optical signals received through an optical receiver, and may obtain information, such as the distance, location, depth, etc. of the object, by analyzing the filtered optical signals.

The optical receiver of the lidar device for a vehicle may include a bandwidth fixed type optical filter for transmitting an optical signal having a specific band in order to filter the remaining signals, except the optical signal reflected by the object, among the plurality of optical signals.

The Background Technology of the present disclosure is disclosed in Korean Patent Application Laid-Open No. 10-2019-0030027 (Mar. 21, 2019) entitled "LiDAR Apparatus and Method of Operating LiDAR Apparatus."

The above information disclosed in this Background section is only for enhancement of understanding of the background of the invention and, therefore, it may contain information that does not constitute prior art.

SUMMARY

Exemplary embodiments of the present invention When a temperature of a lidar device for a vehicle changes, a change in the center wavelength of an optical signal reflected by an object may occur. When a change in the center wavelength of the optical signal reflected by the object occurs, at least some of the optical signal reflected by the object are filtered through a bandwidth fixed type optical filter for transmitting an optical signal having a specific band, so that object detection performance of the lidar device for a vehicle may be degraded. Furthermore, the lidar device for a vehicle is characterized in that as the temperature thereof rises, a voltage necessary for driving the lidar device increases. If a fixed driving voltage is provided, however, object detection performance of the lidar device may be degraded as the temperature thereof rises. Accordingly, a solution may be required so as for a lidar device for a vehicle to provide optimal object detection performance regardless of a temperature change of the lidar device for a vehicle.

Various embodiments of the present disclosure provide a method and apparatus for providing, by a lidar device for a vehicle, optimal object performance regardless of a temperature change of the lidar device for a vehicle.

In an embodiment, a lidar device for a vehicle may include an optical transmitter configured to transmit an optical signal, an optical receiver configured to receive a plurality of optical signals incident in different directions, at least one temperature sensor configured to identify a temperature of the lidar device, and a processor operatively coupled with the optical transmitter, the optical receiver, and the at least one temperature sensor. The processor may be configured to control the optical transmitter to transmit an optical signal for detecting an object, receive an optical signal, reflected by the object, through the optical receiver, identify a temperature of the lidar device through the temperature sensor in response to the identifying of intensity of the optical signal being less than reference intensity, and adjust a bandpass of an optical filter of the optical receiver based on the temperature of the lidar device. The processor may be further configured to identify an operating mode of the vehicle, and adjust the bandpass of the optical filter of the optical receiver based on the temperature of the lidar device and the operating mode of the vehicle In an embodiment, a lidar device for a vehicle may include an optical transmitter configured to transmit an optical signal, an optical receiver configured to receive a plurality of optical signals incident in different directions, at least one temperature sensor configured to identify a temperature of the lidar device, and a processor operatively coupled with the optical transmitter, the optical receiver, and the at least one temperature sensor. The processor may be configured to control the optical transmitter to transmit an optical signal for detecting an object, receive an optical signal, reflected by the object, through the optical receiver, identify a temperature of the lidar device through the temperature sensor in response to the identifying of intensity of the optical signal being less than reference intensity, and adjust a driving voltage of the lidar device based on the temperature of the lidar device.

In an embodiment, a lidar device for a vehicle may include an optical transmitter configured to transmit an optical signal, an optical receiver configured to receive a plurality of optical signals incident in different directions, at least one temperature sensor configured to identify a temperature of the lidar device, and a processor operatively coupled with the optical transmitter, the optical receiver, and the at least one temperature sensor. The processor is configured to control the optical transmitter to transmit an optical signal for detecting an object, receive an optical signal, reflected by the object, through the optical receiver, identify a temperature of the lidar device through the temperature sensor in response to the identifying of intensity of the optical signal being less than reference intensity, identify an operating mode of the vehicle, and adjust a driving voltage of the lidar device based on the temperature of the lidar device and the operating mode of the vehicle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
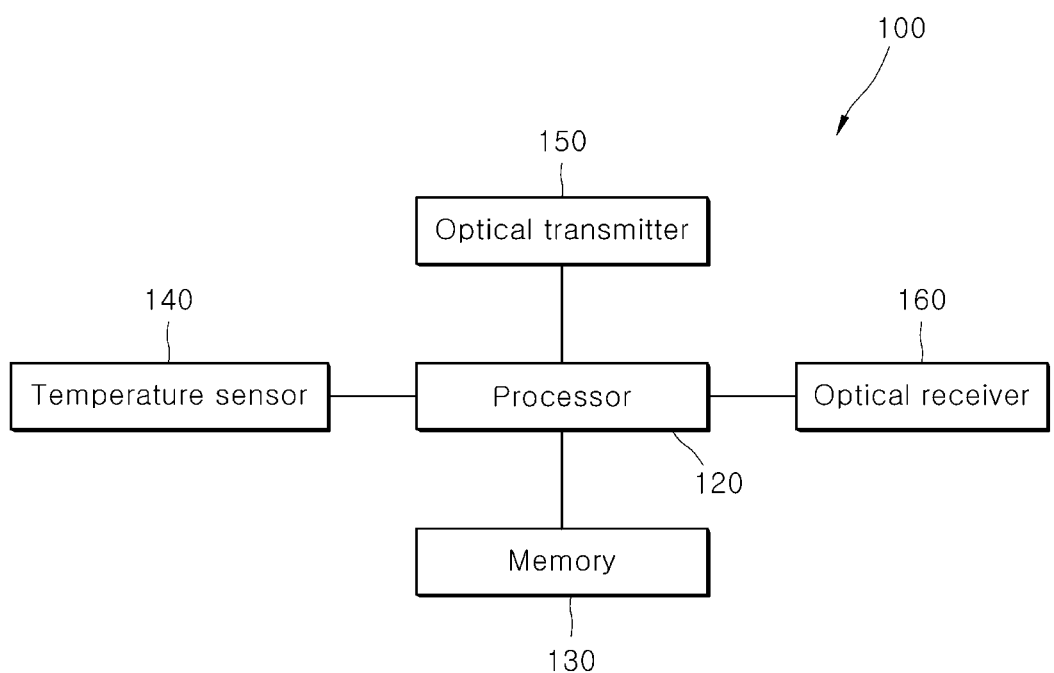
FIG. 1 is a block diagram of a lidar device for a vehicle according to various embodiments.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

Figure 2:
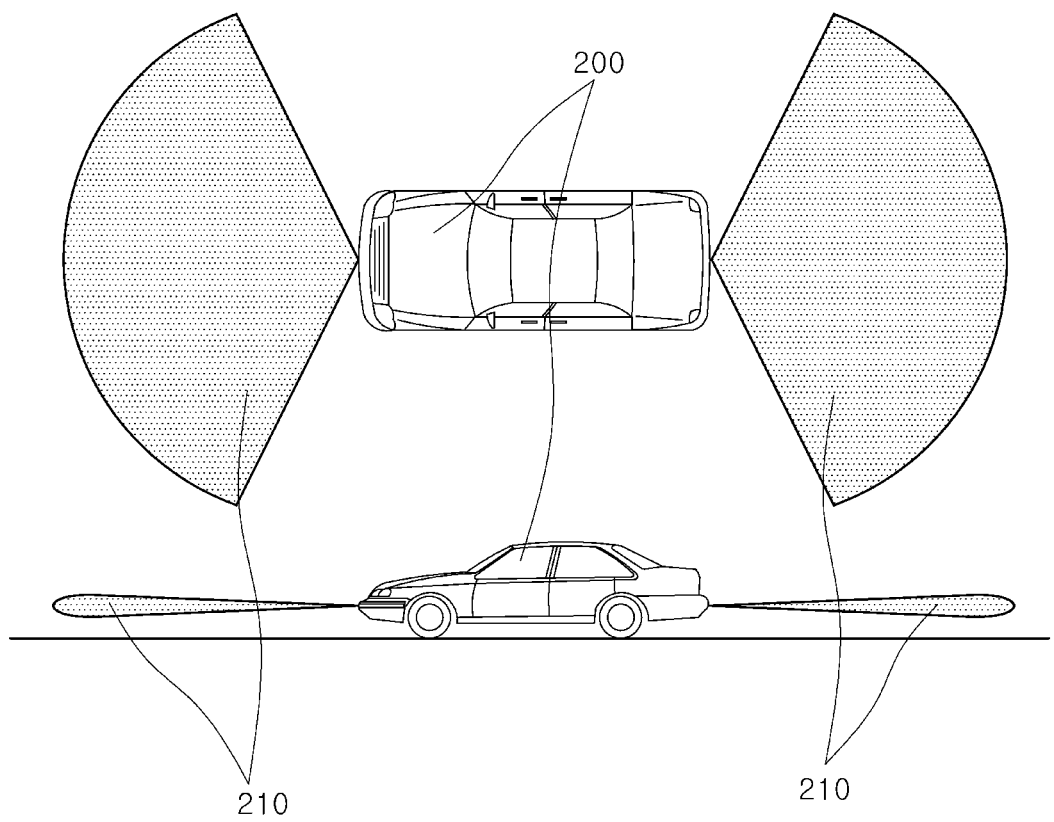
FIG. 2 is an exemplary diagram for describing a method of detecting, by the lidar device for a vehicle, an object according to various embodiments.

FIG. 1 is a block diagram of a lidar device 100 for a vehicle according to various embodiments. FIG. 2 is an exemplary diagram illustrating a method of detecting, by the lidar device 100 for a vehicle, an object according to various embodiments.

According to various embodiments, the lidar device 100 for a vehicle may be mounted on a bumper at the front and/or rear of a vehicle in order to detect an object positioned in front of and/or behind the vehicle, but the present disclosure is not limited thereto. For example, the lidar device for a vehicle may be mounted on the side of a vehicle in order to detect the object positioned on the side (e.g., left side or right side) of the vehicle.

Referring to FIGS. 1 and 2, the lidar device 100 for a vehicle may include at least one of a processor 120, a memory 130, a temperature sensor 140, an optical transmitter 150 or an optical receiver 160.

According to various embodiments, the processor 120 may control a plurality of hardware or software elements coupled to the processor 120 by driving an operating system or application, and may perform a variety of types of data processing and operations. According to an embodiment, the processor 120 may be implemented as a system on chip (SoC). The processor 120 may load, onto the memory 130, an instruction or data received from at least one of other elements, may process the loaded instruction or data, and may store various data in the memory 130.

According to various embodiments, the processor 120 may transmit optical signal configured to detect an object, through the optical transmitter 150. For example, as in FIG. 2, when the lidar device 100 for a vehicle is operating, the processor 120 may control the optical transmitter 150 to transmit an optical signal 210 in multiple directions in order to detect the object positioned in front of and/or behind a vehicle 200.

According to various embodiments, the processor 120 may receive a plurality of return optical signals through the optical receiver 160. The processor 120 may filter out the remaining optical signals, except the object optical signal reflected by the object, using the optical filter of the optical receiver 160, among the plurality of return optical signals received through the optical receiver 160. For example, the processor 120 may obtain (or load) an initial setting value of the optical filter of the optical receiver 160 from the memory 130, may adjust (or set) the bandpass of the optical filter based on the obtained initial setting value, and may filter the remaining optical signals, except the object optical signal reflected by the object, using the optical filter having the adjusted bandpass, among the plurality of return optical signals. For another example, the processor 120 may identify a temperature of the lidar device 100 for a vehicle using the temperature sensor 140. The processor 120 may identify, in the memory 130, a setting value of the optical filter corresponding to the temperature of the lidar device 100 for a vehicle, may adjust (or set) the bandpass of the optical filter based on the identified setting value, and may filter the remaining optical signals, except the object optical signal reflected by the object, using the optical filter having the adjusted bandpass, among the plurality of return optical signals. According to an embodiment, the optical filter may include a plurality of low pass filters (LPF) and a plurality of high pass filters (HPF) in order to transmit an optical signal having a specific band corresponding to a temperature of the lidar device for a vehicle.

According to various embodiments, when the object optical signal is filtered through the optical filter of the optical receiver 160, the processor 120 may identify the intensity (e.g., received signal strength indicator (RSSI)) of the filtered object optical signal. According to an embodiment, when the intensity of the filtered object optical signal is less than reference intensity, the processor 120 may determine that a change in the center wavelength of the object optical signal reflected by the object has occurred due to a temperature change of the lidar device 100 for a vehicle, and may adjust the bandpass of the optical filter of the optical receiver 160. For example, the processor 120 may identify a temperature of the lidar device 100 for a vehicle through the temperature sensor 140, and may adjust the bandpass of the optical filter of the optical receiver 160 based on the identified temperature. For another example, the processor 120 may identify a temperature of the lidar device 100 for a vehicle through the temperature sensor 140, may identify an operating mode (e.g., driving mode or parking mode) of a vehicle, and may adjust the bandpass of the optical filter of the optical receiver 160 based on the temperature of the lidar device 100 for a vehicle and the operating mode of the vehicle. According to an embodiment, when the intensity of the filtered object optical signal is less than the reference intensity, the processor 120 may determine that object detection performance of the lidar device 100 for a vehicle has been degraded, and may adjust a driving voltage of the lidar device for a vehicle. For example, the processor 120 may identify a temperature of the lidar device 100 for a vehicle through the temperature sensor 140, and may adjust a driving voltage of the lidar device 100 for a vehicle based on the identified temperature. For another example, the processor 120 may identify a temperature of the lidar device 100 for a vehicle through the temperature sensor 140, may identify an operating mode of the vehicle, and may adjust a driving voltage of the lidar device 100 for a vehicle based on the temperature of the lidar device 100 for a vehicle and the operating mode of the vehicle. According to various embodiments, the temperature sensor 140 may be positioned inside and/or outside the lidar device 100 for a vehicle, and may provide the processor 120 with information about a temperature detected inside and/or outside the lidar device 100 for a vehicle. According to an embodiment, when the intensity of the filtered object optical signal is equal to or more than the reference intensity, the processor 120 may detect the object by obtaining information on at least one of the distance between the vehicle and the object, a relative location of the object for the vehicle or a shape of the object based on the filtered object optical signal.

Figure 3:
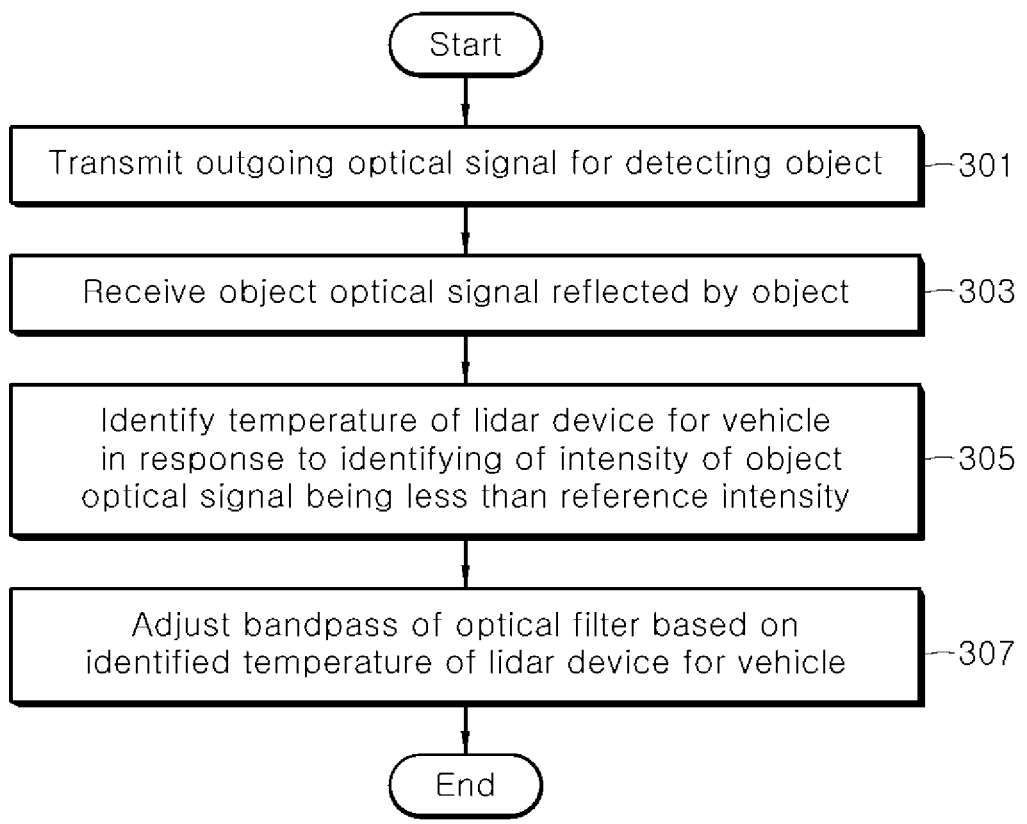
FIG. 3 is a flowchart for describing an example of a method of detecting, by a lidar device for a vehicle, an object according to various embodiments.
Figure 4:
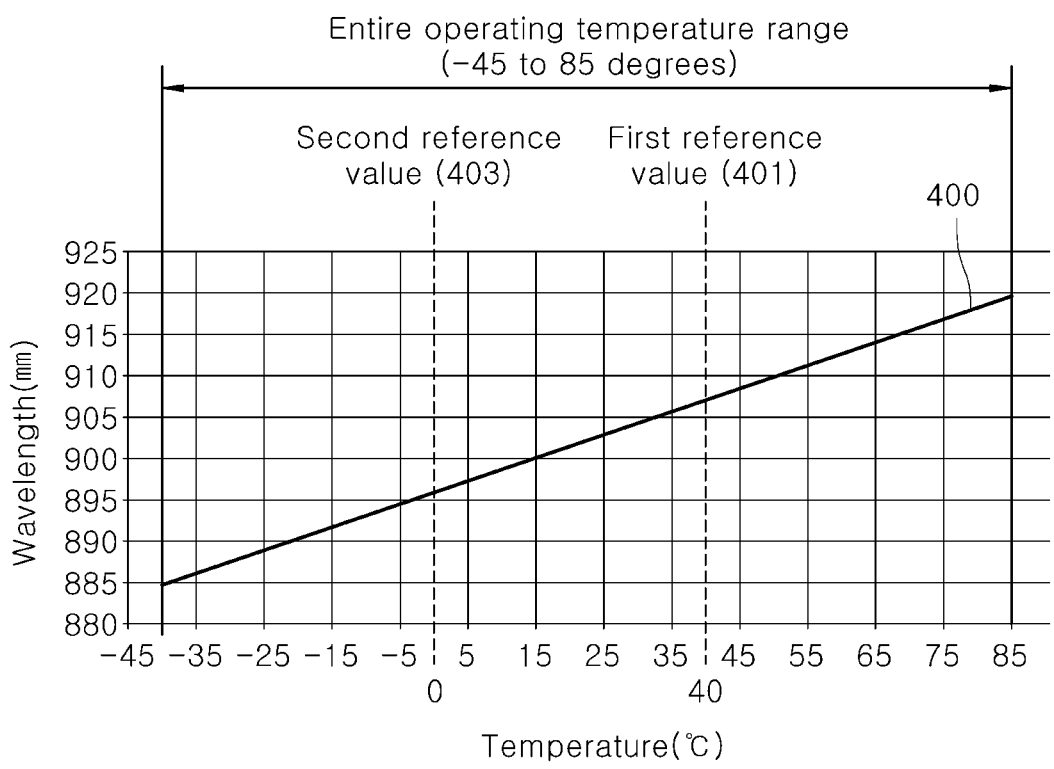
FIG. 4 is a graph illustrating a change in the center wavelength of an optical signal, which is reflected by an object and received, in a lidar device for a vehicle according to various embodiments.

FIG. 3 is a flowchart illustrating an example of a method of detecting, by a lidar device for a vehicle, an object according to various embodiments. FIG. 4 is a graph illustrating a change in the center wavelength of an optical signal, which is reflected by the object and received, in a lidar device for a vehicle according to various embodiments.

Referring to FIGS. 3 and 4, at operation 301, a processor (e.g., the processor 120 in FIG. 1) of a lidar device for a vehicle (e.g., the lidar device 100 for a vehicle in FIG. 1) may transmit an optical signal configured to detect an object, through an optical transmitter (e.g., the optical transmitter 150 in FIG. 1). According to an embodiment, the lidar device 100 for a vehicle may be attached to the bumper of a vehicle in order to detect the object positioned in front of and/or behind a vehicle. According to an embodiment, the processor 120 may obtain an initial setting value of the optical filter of an optical receiver (e.g., the optical receiver 160 in FIG. 1) from a memory (e.g., the memory 130 in FIG. 1) in response to the transmission of the outgoing optical signal through the optical transmitter 150, and may adjust (or set) the bandpass of the optical filter of the optical receiver based on the obtained initial setting value. According to an embodiment, the processor 120 may identify a temperature of the lidar device 100 for a vehicle through a temperature sensor (e.g., the temperature sensor 140 in FIG. 1) in response to the transmission of the outgoing optical signal through the optical transmitter 150, may obtain, from the memory 130, an initial setting value of the optical filter of the optical receiver 160 corresponding to the identified temperature, and may adjust (or set) the bandpass of the optical filter of the optical receiver 160 based on the obtained initial setting value.

At operation 303, the processor 120 may receive the object optical signal, reflected by the object, through the optical receiver 160. For example, the processor 120 may receive a plurality of return optical signals, including the object optical signal reflected by the object, through the optical receiver 160, and may filter the plurality of received return optical signals through the optical filter of the optical receiver 160 in order to identify the object optical signal reflected by the object, among the plurality of return optical signals. According to an embodiment, as in FIG. 4, a center wavelength 400 of the object optical signal reflected by the object may be increased as a temperature of the lidar device 100 for a vehicle rises.

At operation 305, the processor 120 may identify a temperature of the lidar device 100 for a vehicle through the temperature sensor 140 in response to the identifying of the intensity of the object optical signal being less than reference intensity. When the temperature of the lidar device 100 for a vehicle changes, the center wavelength of the object optical signal reflected by the object may be changed. Accordingly, object detection performance of the lidar device 100 for a vehicle may be degraded. In order to perform a process of preventing the degradation in object detection performance attributable to a temperature change of the lidar device 100 for a vehicle, the processor 120 may measure a temperature of the lidar device 100 for a vehicle through the temperature sensor 140. According to various embodiments, when the intensity of the object optical signal is equal to or more than the reference intensity, the processor 120 may detect the object based on the object optical signal filtered through the optical filter of the optical receiver 160.

At operation 307, the processor 120 may adjust the bandpass of the optical filter based on the temperature of the lidar device. For example, when a temperature of the lidar device 100 for a vehicle is equal to or more than a first reference value 401 (e.g., 40 degrees) in FIG. 4, the processor 120 may adjust the bandpass of the optical filter of the optical receiver 160 to a first range (e.g., 905 nm to 925 nm). For another example, when the temperature of the lidar device 100 for a vehicle is equal to or more than a second reference value 403 (e.g., 0 degree) and less than the first reference value in FIG. 4, the processor 120 may adjust the bandpass of the optical filter of the optical receiver 160 to a second range (e.g., 890 nm to 910 nm). For still another example, when the temperature of the lidar device 100 for a vehicle is less than the second reference value in FIG. 4, the processor 120 may adjust the bandpass of the optical filter of the optical receiver 160 to a third range (e.g., 880 nm to 900 nm). According to an embodiment, the optical filter may be configured with LPFs and HPFs configured to filter the remaining signals except an optical signal having a specific band. Table 1 below illustrates examples of the bandpasses of an optical filter adjusted based on temperatures of the lidar device 100 for a vehicle and filters used therefor.

TABLE 1

|  | Less than 0 degree | 0 degree or more and less than 40 degrees | 40 degrees or more |
| --- | --- | --- | --- |
| Bandpass | 880 nm to 900 nm | 890 nm to 910 nm | 905 nm to 925 nm |
| LPF | 880 nm | 890 nm | 905 nm |
| HPF | 900 nm | 910 nm | 925 nm |

As described above, although a change in the center wavelength of the object optical signal reflected by the object occurs due to a temperature change of the lidar device 100 for a vehicle, the lidar device 100 for a vehicle can properly filter the remaining optical signals, except the object optical signal reflected by the object among a plurality of return optical signals received through the optical receiver 160, by adjusting the bandpass of the optical filter of the optical receiver 160. Accordingly, the lidar device 100 for a vehicle can maintain optimal performance regardless of a temperature change of the lidar device 100 for a vehicle.

Figure 5:
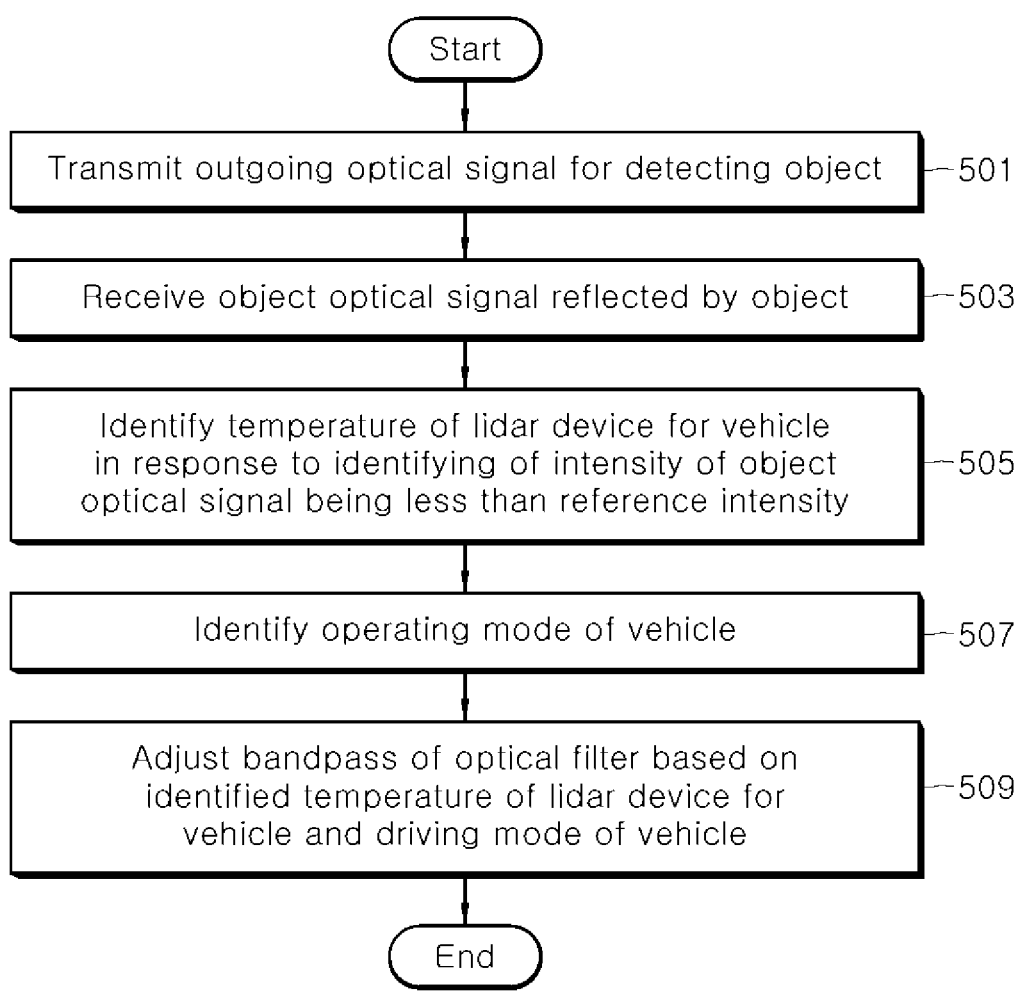
FIG. 5 is a flowchart for describing another example of a method of detecting, by a lidar device for a vehicle, an object according to various embodiments.

FIG. 5 is a flowchart illustrating another example of a method of detecting, by a lidar device for a vehicle, an object according to various embodiments.

Referring to FIG. 5, at operation 501, a processor (e.g., the processor 120 in FIG. 1) of a lidar device for a vehicle (e.g., the lidar device 100 for a vehicle in FIG. 1) may transmit an outgoing optical signal configured to detect an object, through an optical transmitter (e.g., the optical transmitter 150 in FIG. 1). According to an embodiment, the lidar device 100 for a vehicle may be attached to the bumper of a vehicle in order to detect the object positioned in front of and/or behind the vehicle. According to an embodiment, the processor 120 may obtain an initial setting value of the optical filter of an optical receiver (e.g., the optical receiver 160 in FIG. 1) from a memory (e.g., the memory 130 in FIG. 1) in response to the transmission of the outgoing optical signal through the optical transmitter 150, and may adjust (or set) the bandpass of the optical filter of the optical receiver based on the obtained initial setting value. According to an embodiment, the processor 120 may identify a temperature of the lidar device 100 for a vehicle through a temperature sensor (e.g., the temperature sensor 140 in FIG. 1) in response to the transmission of the outgoing optical signal through the optical transmitter 150. The processor 120 may obtain, from the memory 130, an initial setting value of the optical filter of the optical receiver 160 corresponding to the identified temperature, and may adjust (or set) the bandpass of the optical filter of the optical receiver 160 based on the obtained initial setting value.

At operation 503, the processor 120 may receive the object optical signal, reflected by the object, through the optical receiver 160. For example, the processor 120 may receive a plurality of return optical signals, including the object optical signal reflected by the object, through the optical receiver 160, and may filter the plurality of return optical signals through the optical filter of the optical receiver 160 in order to identify the object optical signal reflected by the object among the plurality of return optical signals.

At operation 505, the processor 120 may identify a temperature of the lidar device 100 for a vehicle through the temperature sensor 140 in response to the identifying of the intensity of the object optical signal being less than reference intensity. According to various embodiments, when the intensity of the object optical signal is equal to or more than the reference intensity, the processor 120 may detect the object based on the object optical signal filtered through the optical filter of the optical receiver 160.

At operation 507, the processor 120 may identify an operating mode of the vehicle in response to the identifying of the temperature of the lidar device 100 for a vehicle. For example, the processor 120 may identify whether the operating mode of the vehicle is a driving mode or a parking mode.

At operation 509, the processor 120 may adjust the bandpass of the optical filter of the optical receiver 160 based on the identified temperature of the lidar device 100 for a vehicle and the parking mode of the vehicle. For example, when the operating mode of the vehicle is the driving mode, the processor 120 may adjust the bandpass of the optical filter of the optical receiver 160 using the same method as that at operation 307 in FIG. 3. For another example, when the operating mode of the vehicle is the parking mode, the processor 120 may maintain the bandpass of the optical filter of the optical receiver 160 regardless of a temperature of the lidar device 100 for a vehicle.

It has been described above that the lidar device 100 for a vehicle performs an operation of identifying a temperature of the lidar device 100 for a vehicle through the temperature sensor 140 in response to the identifying of the intensity of the object optical signal being less than the reference intensity and then performs an operation of identifying an operating mode of the vehicle. According to various embodiments of the present disclosure, however, the operation of identifying a temperature of the lidar device 100 for a vehicle and the operation of identifying an operating mode of the vehicle may be performed in parallel. Alternatively, after the operation of identifying an operating mode of the vehicle is performed, the operation of identifying a temperature of the lidar device 100 for a vehicle may be performed.

As described above, although a change in the center wavelength of the object optical signal reflected by the object occurs due to a temperature change of the lidar device 100 for a vehicle, the lidar device 100 for a vehicle can properly filter the remaining optical signals except the object optical signal reflected by the object, among a plurality of return optical signals received through the optical receiver 160, by adjusting the bandpass of the optical filter of the optical receiver 160. Accordingly, the lidar device 100 for a vehicle can maintain optimal performance regardless of a temperature change of the lidar device 100 for a vehicle.

Figure 6:
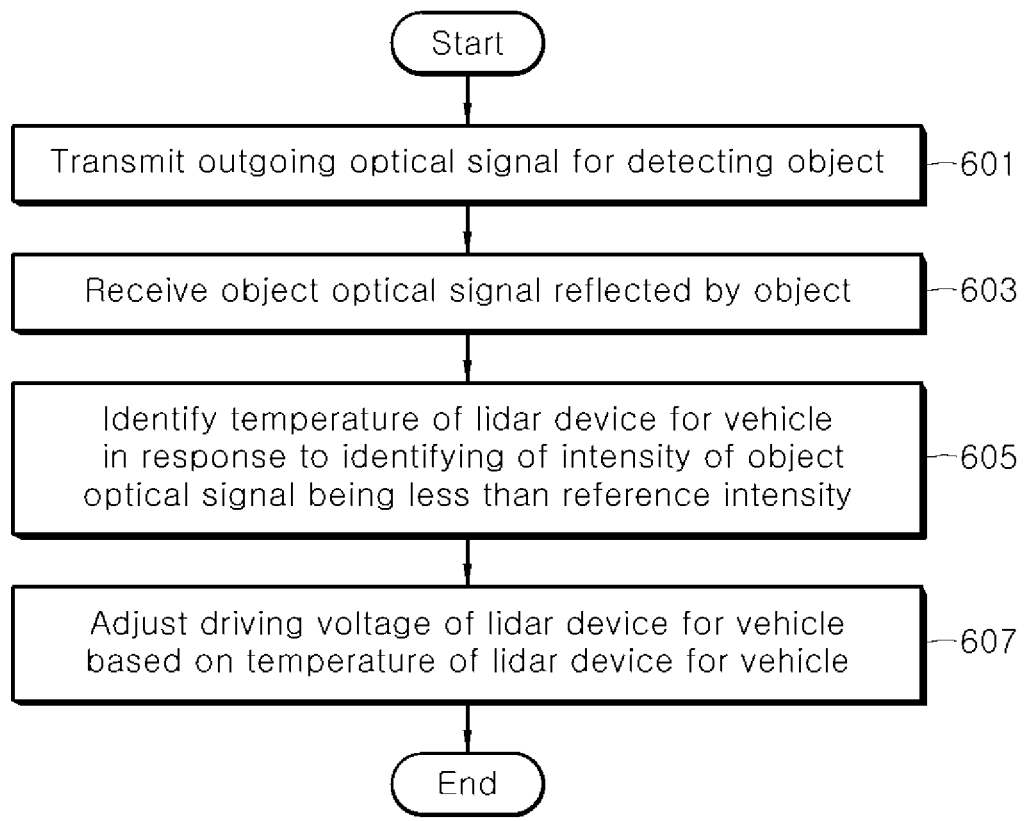
FIG. 6 is a flowchart for describing still another example of a method of detecting, by a lidar device for a vehicle, an object according to various embodiments.
Figure 7:
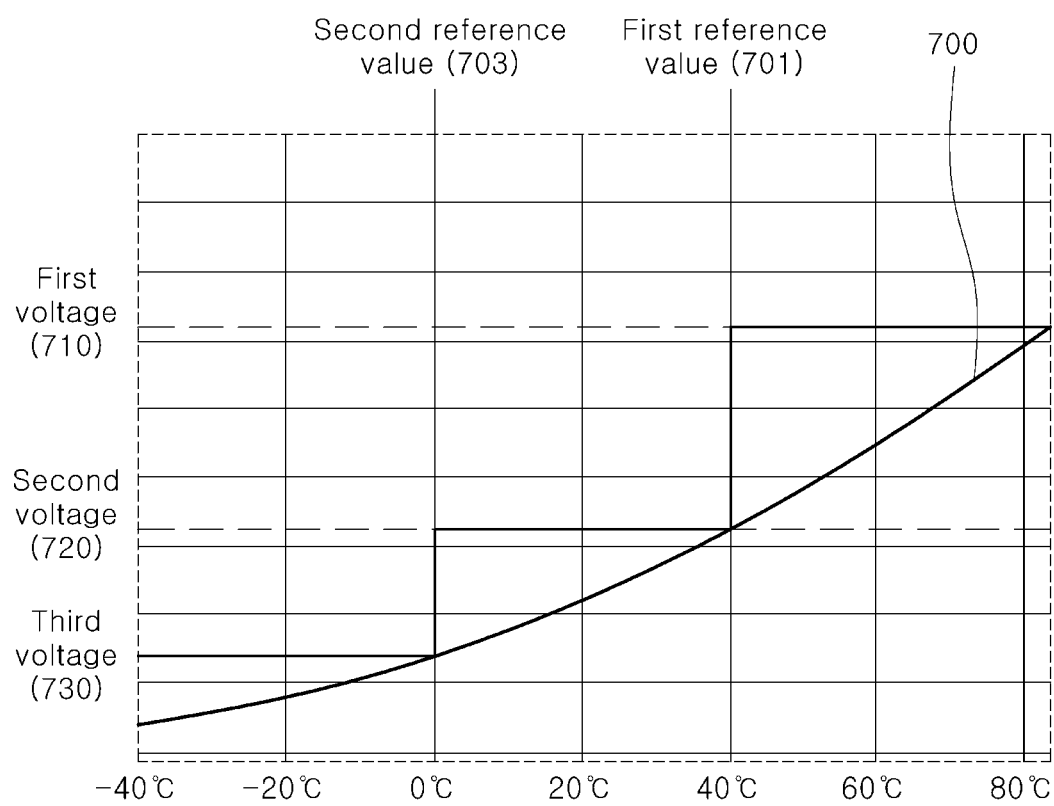
FIG. 7 is a graph illustrating driving voltages of the lidar device for a vehicle based on temperature changes in the lidar device for a vehicle according to various embodiments.

FIG. 6 is a flowchart illustrating still another example of a method of detecting, by a lidar device for a vehicle, an object according to various embodiments. FIG. 7 is a graph illustrating driving voltages of the lidar device for a vehicle based on temperature changes in the lidar device for a vehicle according to various embodiments.

Referring to FIGS. 6 and 7, at operation 601, a processor (e.g., the processor 120 in FIG. 1) of a lidar device for a vehicle (e.g., the lidar device 100 for a vehicle in FIG. 1) may transmit an outgoing optical signal configured to detect an object, through an optical transmitter (e.g., the optical transmitter 150 in FIG. 1). According to an embodiment, the lidar device 100 for a vehicle may be attached to the bumper of a vehicle in order to detect the object positioned in front of and/or behind the vehicle. According to an embodiment, the processor 120 may obtain an initial setting value of the optical filter of an optical receiver (e.g., the optical receiver 160 in FIG. 1) from a memory (e.g., the memory 130 in FIG. 1) in response to the transmission of the outgoing optical signal through the optical transmitter 150, and may adjust (or set) the bandpass of the optical filter of the optical receiver based on the obtained initial setting value. According to an embodiment, the lidar device 100 for a vehicle may be driven by a second voltage 720 in FIG. 7. According to an embodiment, the processor 120 may identify a temperature of the lidar device 100 for a vehicle through a temperature sensor (e.g., the temperature sensor 140 in FIG. 1) in response to the transmission of the outgoing optical signal through the optical transmitter 150, may obtain, from the memory 130, an initial setting value of the optical filter of the optical receiver 160 corresponding to the identified temperature, and may adjust (or set) the bandpass of the optical filter of the optical receiver 160 based on the obtained initial setting value.

At operation 603, the processor 120 may receive an optical signal, reflected by the object, through the optical receiver 160. For example, the processor 120 may receive a plurality of return optical signals, including the object optical signal reflected by the object, through the optical receiver 160, and may filter the plurality of return optical signals through the optical filter of the optical receiver 160 in order to identify the object optical signal reflected by the object among the plurality of optical signals.

At operation 605, the processor 120 may identify a temperature of the lidar device 100 for a vehicle through the temperature sensor 140 in response to the identifying of the intensity of the object optical signal being less than reference intensity. When a temperature of the lidar device 100 for a vehicle is changed, as in FIG. 7, a voltage 700 necessary to drive the lidar device 100 for a vehicle may be changed. Accordingly, object detection performance of the lidar device 100 for a vehicle may be degraded. The processor 120 may measure a temperature of the lidar device 100 for a vehicle using the temperature sensor 140 in order to perform a process of preventing the degradation in object detection performance attributable to a temperature change of the lidar device 100 for a vehicle. According to an embodiment, when the intensity of the object optical signal is equal to or more than the reference intensity, the processor 120 may detect the object based on the object optical signal filtered through the optical filter of the optical receiver 160.

At operation 607, the processor 120 may adjust a driving voltage of the lidar device 100 for a vehicle based on the temperature of the lidar device 100 for a vehicle. For example, when the temperature of the lidar device 100 for a vehicle is equal to or more than a first reference value 701 in FIG. 7, the processor 120 may adjust the driving voltage of the lidar device 100 for a vehicle to a first voltage 710. For another example, when the temperature of the lidar device 100 for a vehicle is equal to or more than a second reference value 703 and less than the first reference value 701 in FIG. 7, the processor 120 may maintain the driving voltage of the lidar device 100 for a vehicle to the second voltage 720. For still another example, when the temperature of the lidar device 100 for a vehicle is less than the second reference value 703 in FIG. 7, the processor 120 may adjust the driving voltage of the lidar device 100 for a vehicle to a third voltage 730.

As described above, the lidar device 100 for a vehicle can prevent the degradation of object detection performance attributable to a temperature change of the lidar device 100 for a vehicle by adjusting a driving voltage of the lidar device 100 for a vehicle based on the temperature change of the lidar device 100 for a vehicle. Furthermore, when a temperature of the lidar device 100 for a vehicle is less than a given temperature, the lidar device 100 for a vehicle can efficiently manage power of a vehicle by lowering a driving voltage of the lidar device 100 for a vehicle without degrading object detection performance of the lidar device 100 for a vehicle.

Figure 8:
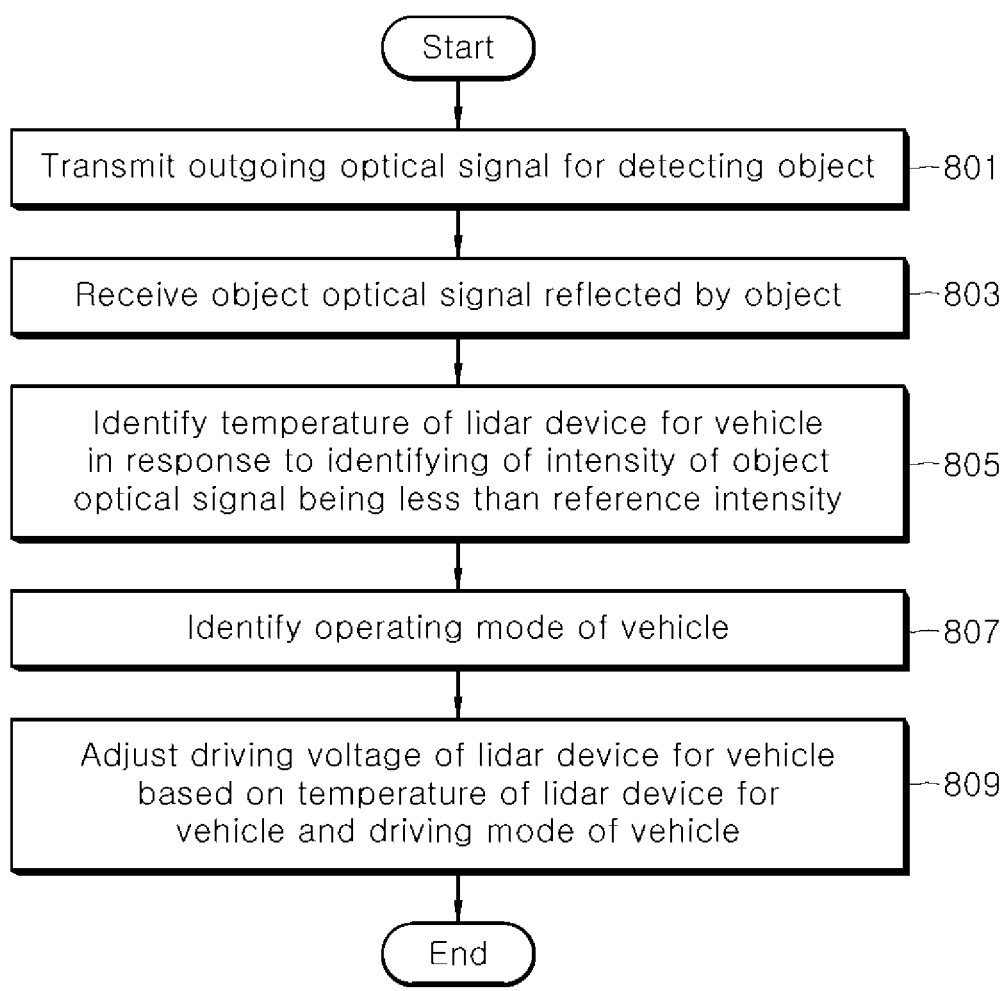
FIG. 8 is a flowchart for describing yet another example of a method of detecting, by the lidar device for a vehicle, an object according to various embodiments.

FIG. 8 is a flowchart illustrating yet another example of a method of detecting, by a lidar device for a vehicle, an object according to various embodiments.

Referring to FIG. 8, at operation 801, a processor (e.g., the processor 120 in FIG. 1) of a lidar device for a vehicle (e.g., the lidar device 100 for a vehicle in FIG. 1) may transmit an outgoing optical signal configured to detect an object, through an optical transmitter (e.g., the optical transmitter 150 in FIG. 1). According to an embodiment, the lidar device 100 for a vehicle may be attached to the bumper of a vehicle in order to detect the object positioned in front of and/or behind the vehicle. According to an embodiment, the processor 120 may obtain an initial setting value of the optical filter of an optical receiver (e.g., the optical receiver 160 in FIG. 1) from a memory (e.g., the memory 130 in FIG. 1) in response to the transmission of the outgoing optical signal through the optical transmitter 150, and may adjust (or set) the bandpass of the optical filter of the optical receiver based on the obtained initial setting value. According to an embodiment, the lidar device 100 for a vehicle may be driven by the second voltage 720 in FIG. 7. According to an embodiment, the processor 120 may identify a temperature of the lidar device 100 for a vehicle through a temperature sensor (e.g., the temperature sensor 140 in FIG. 1) in response to the transmission of the outgoing optical signal through the optical transmitter 150. The processor 120 may obtain, from the memory 130, a initial setting value of the optical filter of the optical receiver 160 corresponding to the identified temperature, and may adjust (or set) the bandpass of the optical filter of the optical receiver 160 based on the obtained initial setting value.

At operation 803, the processor 120 may receive the object optical signal, reflected by the object, through the optical receiver 160. For example, the processor 120 may receive a plurality of return optical signals, including the object optical signal reflected by the object, through the optical receiver 160, and may filter the plurality of return optical signals through the optical filter of the optical receiver 160 in order to identify the object optical signal reflected by the object among the plurality of optical signals.

At operation 805, the processor 120 may identify a temperature of the lidar device 100 for a vehicle through the temperature sensor 140 in response to the identifying of the intensity of the object optical signal being less than reference intensity. When the temperature of the lidar device 100 for a vehicle is changed, as in FIG. 7, the voltage 700 necessary to drive the lidar device 100 for a vehicle may be changed. Accordingly, object detection performance of the lidar device 100 for a vehicle may be degraded. The processor 120 may measure a temperature of the lidar device 100 for a vehicle through the temperature sensor 140 in order to perform a process of preventing the degradation in object detection performance attributable to the temperature change of the lidar device 100 for a vehicle. According to an embodiment, when the intensity of the object optical signal is equal to or more than the reference intensity, the processor 120 may detect the object based on the object optical signal filtered through the optical filter of the optical receiver 160.

At operation 807, the processor 120 may identify an operating mode of the vehicle in response to the identifying of the temperature of the lidar device 100 for a vehicle. For example, the processor 120 may identify whether the operating mode of the vehicle is a driving mode or a parking mode.

At operation 809, the processor 120 may adjust a driving voltage of the lidar device for a vehicle based on the identified temperature of the lidar device 100 for a vehicle and the operating mode of the vehicle. For example, when the operating mode of the vehicle is the driving mode, the processor 120 may adjust the driving voltage of the lidar device 100 for a vehicle using the same method as that at operation 607 in FIG. 6. For another example, when the operating mode of the vehicle is the parking mode and the temperature of the lidar device 100 for a vehicle is equal to or more than the second reference value 701 in FIG. 7, the processor 120 may maintain the driving voltage of the lidar device 100 for a vehicle to the second voltage 720. For still another example, when the operating mode of the vehicle is the parking mode and the temperature of the lidar device 100 for a vehicle is less than the second reference value 703 in FIG. 7, the processor 120 may adjust the driving voltage of the lidar device 100 for a vehicle to the third voltage 730.

It has been described above that the lidar device 100 for a vehicle performs an operation of identifying a temperature of the lidar device 100 for a vehicle through the temperature sensor 140 in response to the identifying of the intensity of the object optical signal being less than the reference intensity and then performs an operation of identifying an operating mode of the vehicle. According to various embodiments of the present disclosure, however, the operation of identifying a temperature of the lidar device 100 and the operation of identifying an operating mode of the vehicle may be performed in parallel. Alternatively, after the operation of identifying an operating mode of the vehicle is performed, the operation of identifying a temperature of the lidar device 100 for a vehicle may be performed.

As described above, the lidar device 100 for a vehicle can prevent the degradation in object detection performance attributable to a temperature change of the lidar device 100 for a vehicle by adjusting a driving voltage of the lidar device 100 for a vehicle based on the temperature change of the lidar device 100 for a vehicle. Furthermore, when a temperature of the lidar device 100 for a vehicle is equal to or more than a given temperature and an operating mode of a vehicle is the parking mode, the degradation in object detection performance is not highly problematic. Accordingly, the lidar device 100 for a vehicle can efficiently manage power of the vehicle by maintaining a driving voltage of the lidar device 100 for a vehicle.

According to various embodiments of the present disclosure, the lidar device for a vehicle can provide optimal object detection performance by adjusting the bandpass of the optical filter of the optical receiver in consideration of a temperature of the lidar device for a vehicle, although a change in the center wavelength of the object optical signal reflected by an object occurs due to a temperature change of the lidar device for a vehicle.

According to various embodiments of the present disclosure, the lidar device for a vehicle can provide optimal object detection performance, regardless of a temperature of the lidar device for a vehicle, by adjusting a driving voltage of the lidar device for a vehicle based on a temperature of the lidar device for a vehicle.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A lidar device for a vehicle, comprising:
an optical transmitter configured to transmit an outgoing optical signal;
an optical receiver configured to receive a plurality of return optical signals incident in different directions;
at least one temperature sensor configured to identify a temperature of the lidar device; and
a processor operatively coupled with the optical transmitter, the optical receiver, and the at least one temperature sensor,
wherein the processor is configured to:
control the optical transmitter to transmit the outgoing optical signal configured to detect an object,
receive an object optical signal as one of the return optical signals, reflected by the object, through the optical receiver,
identify a temperature of the lidar device through the temperature sensor in response to the identifying of intensity of the object optical signal being less than reference intensity, and
adjust a bandpass of an optical filter of the optical receiver based on the temperature of the lidar device.

2. The lidar device of claim 1, wherein the processor is configured to maintain the bandpass of the optical filter when the intensity of the object optical signal is equal to or more than the reference intensity.

3. The lidar device of claim 1, wherein the processor is configured to:
adjust the bandpass of the optical filter to a first range when the temperature of the lidar device is equal to or more than a first reference value,
adjust the bandpass of the optical filter to a second range when the temperature of the lidar device is equal to or more than a second reference value and is less than the first reference value, wherein the second reference value is less than the first reference value, and
adjust the bandpass of the optical filter to a third range when the temperature of the lidar device is less than the second reference value,
wherein the first range comprises values of bands higher than the second range, and
the second range comprises values of bands higher than the third range.

4. The lidar device of claim 1, further comprising:
a memory operatively coupled with the processor,
wherein the processor is configured to obtain an initial setting value of the optical filter from the memory in response to a reception of an input to request the detection of the object through the lidar device, and adjust the bandpass of the optical filter based on the obtained initial setting value.

5. The lidar device of claim 1, wherein the processor is further configured to:
identify an operating mode of the vehicle, and
adjust the bandpass of the optical filter of the optical receiver based on the temperature of the lidar device and the operating mode of the vehicle.

6. The lidar device of claim 5, wherein the processor is configured to maintain the bandpass of the optical filter when the intensity of the object optical signal is equal to or more than the reference intensity.

7. The lidar device of claim 5, wherein the processor is configured to:
adjust the bandpass of the optical filter based on the temperature of the lidar device in response to the identifying of the operating mode of the vehicle being a driving mode, and maintain the bandpass of the optical filter in response to the identifying of the operating mode of the vehicle being a parking mode.

8. The lidar device of claim 7, wherein the processor is configured to:
adjust the bandpass of the optical filter to a first range when the operating mode of the vehicle is the driving mode and the temperature of the lidar device is equal to or more than a first reference value,
adjust the bandpass of the optical filter to a second range when the operating mode of the vehicle is the driving mode and the temperature of the lidar device is equal to or more than a second reference value less than the first reference value and is less than the first reference value, and
adjust the bandpass of the optical filter to a third range when the operating mode of the vehicle is the driving mode and the temperature of the lidar device is less than the second reference value,
the first range comprises values of bands higher than the second range, and
the second range comprises values of bands higher than the third range.

9. The lidar device of claim 5, further comprising a memory operatively coupled with the processor,
wherein the processor is configured to:
obtain an initial setting value of the optical filter from the memory in response to a reception of an input to request the detection of the object through the lidar device, and
adjust the bandpass of the optical filter based on the obtained initial setting value.

10. A lidar device for a vehicle, comprising:
an optical transmitter configured to transmit an outgoing optical signal;
an optical receiver configured to receive a plurality of return optical signals incident in different directions;
at least one temperature sensor configured to identify a temperature of the lidar device; and
a processor operatively coupled with the optical transmitter, the optical receiver, and the at least one temperature sensor,
wherein the processor is configured to:
control the optical transmitter to transmit the outgoing optical signal configured to detect an object,
receive an object optical signal, reflected by the object, through the optical receiver,
identify a temperature of the lidar device through the temperature sensor in response to the identifying of intensity of the object optical signal being less than reference intensity, and
adjust a driving voltage of the lidar device based on the temperature of the lidar device.

11. The lidar device of claim 10, wherein the processor is configured to maintain the driving voltage of the lidar device when the intensity of the object optical signal is equal to or more than the reference intensity.

12. The lidar device of claim 10, wherein the processor is configured to:
adjust the driving voltage of the lidar device to a first voltage when the temperature of the lidar device is equal to or more than a first reference value,
adjust the driving voltage of the lidar device to a second voltage when the temperature of the lidar device is equal to or more than a second reference value less than the first reference value and is less than the first reference value, and
adjust the driving voltage of the lidar device to a third voltage when the temperature of the lidar device is less than the second reference value, and
the second voltage is lower than the first voltage and higher than the third voltage.

13. A lidar device for a vehicle, comprising:
an optical transmitter configured to transmit an outgoing optical signal;
an optical receiver configured to receive a plurality of return optical signals incident in different directions;
at least one temperature sensor configured to identify a temperature of the lidar device; and
a processor operatively coupled with the optical transmitter, the optical receiver, and the at least one temperature sensor,
wherein the processor is configured to:
control the optical transmitter to transmit the outgoing optical signal configured to detect an object,
receive an object optical signal, reflected by the object, through the optical receiver,
identify a temperature of the lidar device through the temperature sensor in response to the identifying of intensity of the object optical signal being less than reference intensity,
identify an operating mode of the vehicle, and
adjust a driving voltage of the lidar device based on the temperature of the lidar device and the operating mode of the vehicle.

14. The lidar device of claim 13, wherein the processor is configured to maintain the driving voltage of the lidar device when the intensity of the object optical signal is equal to or more than the reference intensity.

15. The lidar device of claim 13, wherein the processor is configured to:
adjust the driving voltage of the lidar device to a first voltage when the operating mode of the vehicle is a driving mode and the temperature of the lidar device is equal to or more than a first reference value,
adjust the driving voltage of the lidar device to a second voltage when the operating mode of the vehicle is the driving mode and the temperature of the lidar device is equal to or more than a second reference value less than the first reference value and is less than the first reference value, and
adjust the driving voltage of the lidar device to a third voltage when the operating mode of the vehicle is the driving mode and the temperature of the lidar device is less than the second reference value, and
the second voltage is lower than the first voltage and higher than the third voltage.

16. The lidar device of claim 15, wherein the processor is configured to:
maintain the driving voltage of the lidar device when the operating mode of the vehicle is a parking mode and the temperature of the lidar device is equal to or more than the first reference value,
adjust the driving voltage of the lidar device to the second voltage when the operating mode of the vehicle is the parking mode and the temperature of the lidar device is equal to or more than the second reference value and is less than the first reference value, and
adjust the driving voltage of the lidar device to the third voltage when the operating mode of the vehicle is the parking mode and the temperature of the lidar device is less than the second reference value.

* * * * *